United States Patent [19]

Alfred

[11] Patent Number: 5,595,795
[45] Date of Patent: Jan. 21, 1997

[54] COMPOSITE, PREFORM THEREFORE, METHOD OF MAKING, AND APPARATUS

[75] Inventor: Henry I. Alfred, Amherst, Mass.

[73] Assignee: Netcom Technologies Corp., Amherst, Mass.

[21] Appl. No.: 232,992

[22] Filed: Apr. 25, 1994

[51] Int. Cl.[6] .................................................. B28B 21/00
[52] U.S. Cl. ........................... 428/34.5; 29/91; 156/291;
    156/386; 264/328.1; 264/320; 425/472;
    428/34.7; 428/36.2; 428/110; 428/111; 428/113;
    428/196; 428/198; 428/542.8
[58] Field of Search ..................................... 428/110, 111,
    428/113, 198, 542.8, 196, 34.5, 34.7, 36.2

[56] References Cited

U.S. PATENT DOCUMENTS

| | | |
|---|---|---|
| 2,677,496 | 5/1954 | Maynes . |
| 3,222,237 | 12/1965 | McKelvy . |
| 3,272,645 | 9/1966 | Duhoo et al. . |
| 3,444,024 | 5/1969 | Hillas . |
| 3,444,025 | 5/1969 | Hillas . |
| 3,535,180 | 10/1970 | Gasaway . |
| 4,460,633 | 7/1984 | Kobayashi et al. ............... 428/110 |
| 4,578,301 | 3/1986 | Currie et al. ...................... 428/110 |
| 4,706,430 | 11/1987 | Sugita et al. ...................... 428/110 |
| 4,714,642 | 12/1987 | Mc Aliley et al. ................ 428/198 |
| 4,990,390 | 2/1991 | Kawasaki et al. ................. 428/113 |
| 5,059,361 | 10/1991 | Da Re'. |
| 5,087,193 | 2/1992 | Herbert, Jr. . |
| 5,089,206 | 2/1992 | Kia . |
| 5,122,226 | 6/1992 | Minford et al. . |
| 5,221,391 | 6/1993 | Kittaka et al. . |
| 5,227,113 | 7/1993 | Hamabe et al. . |
| 5,262,230 | 11/1993 | Becker et al. . |
| 5,360,503 | 11/1994 | Cofby ............................. 428/542.8 |

*Primary Examiner*—James C. Cannon
*Attorney, Agent, or Firm*—Richard C. Litman

[57] ABSTRACT

The present invention is a highly predictable composite usable to fabricate such structural articles as complex-shaped automotive body parts and building panels. Included in this composite is at least one netlike preform having a plurality of inter-crossed roving bound to each other at thermoset junction points. This preform is compressed into a mold, and at least one layer of polymer paste is added thereto. The preform layers and the polymer paste layers are compressed to the shape of the mold, and then they are heat and flame treated to complete the curing of the thermoset resin and to produce a desired surface finish.

5 Claims, 9 Drawing Sheets

COMPOSITE, PREFORM THEREFORE, METHOD OF MAKING, AND APPARATUS

BACKGROUND OF THE INVENTION

1. Field of the Invention

The present invention relates to a novel composite and a method and apparatus for manufacturing the same. Specifically, the composite of this invention includes a reinforcing preform having a plurality of inter-crossing strands or roving arranged to form a plurality of junction points. The crossing strands or roving at each of these junction points are connected to each other by a thermoset binding material.

2. Description of the Prior Art

Reinforced polymer based composites, and methods for making the same, are well known in the prior art. U.S. Pat. No. 3,535,180 issued to Glen P. Gasaway on Oct. 20, 1970, discloses a plastic sheeting having a reinforcing layer disposed between two plastic plates. The reinforcing layer is an internal network fabricated from traversing two sets of equally spaced, parallel glass strands. A thermoplastic bonding material is utilized at the points of intersection of the traversing strands. This bonding material fuses the strands together to promote the stability and strength of the network. The melting point of the bonding material is less than the melting point of the glass strands. Therefore, the bonding material can be coated onto the glass strands without detrimentally affecting the integrity of the glass strands. Likewise, the melting point of the plastic plates is less than the melting point of the bonding material, thus permitting the plastic plates to be coated onto the reinforcing network.

U.S. Pat. No. 3,222,237 issued to William R. McKelvy on Dec. 7, 1965, illustrates a unitary plastic sheet having centrally imbedded therein a reinforcing mesh of traversing fibers. One preferred method of fabricating this sheet includes placing a non-woven network of glass scrim or the like between a polyethylene sheet and a film of substantially molten polyethylene. The outer surface of the molten polyethylene film is gradually cooled. As this outer surface cools, the molten center of the film flows through the mesh and fuses with the polyethylene sheet. After continued cooling, a highly flexible solid is formed almost entirely about the reinforcing mesh.

Other patents relating to reinforcing layers for polymer based composites are disclosed in U.S. Pat. No. 3,272,645 issued to Marcel Duhoo, et al. on Sep. 13, 1966, and U.S. Pat. No. 3,444,025 issued to Kenneth M. Hillas on May 13, 1969. The Duhoo, et al. patent shows a flexible laminated sheet material fabricated by coating a web of woven or non-woven material with a non-adhesive gel of thermoplastic or thermosetting material. The coated webs of this invention can be stacked upon each other and then deeply molded under heat and pressure. The Hillas patent discloses a bonded, non-woven scrim produced from two layers of essentially parallel spaced-apart strands and a layer of thermoplastic resin. This layer of thermoplastic resin is heated at a temperature above its melting temperature until it deforms under its own weight and collapses so as to surround the strands of the scrim. The entire structure is then cooled until the thermoplastic resin returns to a solid state.

None of the above inventions and patents, taken either singly or in combination, is seen to describe the instant invention as claimed.

SUMMARY OF THE INVENTION

The present invention relates to a novel composite and a method and apparatus for manufacturing the same. Specifically, the composite of this invention includes a reinforcing preform having a plurality of inter-crossing strands or roving arranged to form a plurality of junction points. The crossing roving at each of these junction points are connected to each other by a thermoset binding material, which is permitted to permeate the roving at each of the junction points. This thermoset binding material solidifies within each junction point to bond the crossing roving together.

After the preform has been fabricated, a desired amount is cut from the manufactured roll of the preform and is placed into a mold. Polymer layers may be added to the preform and the entire structure may be cured by heat treating. One method of combining the preform with one or more polymer layers is to place a first polymer layer into the female portion of a mold. This layer is compressed to the shape of the mold, and the preform is then placed onto the first polymer layer. The preform and this first polymer layer are then compressed, and a second polymer layer is placed upon the preform. Again the contents of the mold are compressed, and the process is repeated for any additional layers. Subsequent to compressing the last layer, the mold is closed and suitably compressed. The resultant structure is then heat treated to complete the curing process and to produce a low profile surface finish.

Accordingly, it is a principal object of the invention to provide a novel preform having a plurality of thermoset junction points.

It is another object of the invention to provide a novel composite having at least one preform with at least one polymer layer secured thereto.

It is a further object of the invention to provide a novel method for fabricating a composite.

Still another object of the invention is to provide novel apparatus for manufacturing a preform and composite.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention is a composite for fabricating such articles as automotive body parts and building panels. This composite is inexpensive, easy to manufacture, and is especially well suited for fabrication into structural articles of a complex shape. The composite includes at least one layer of a highly permeable reinforcing preform 10 and at least one layer of a hybrid polymer paste.

Figure 1:
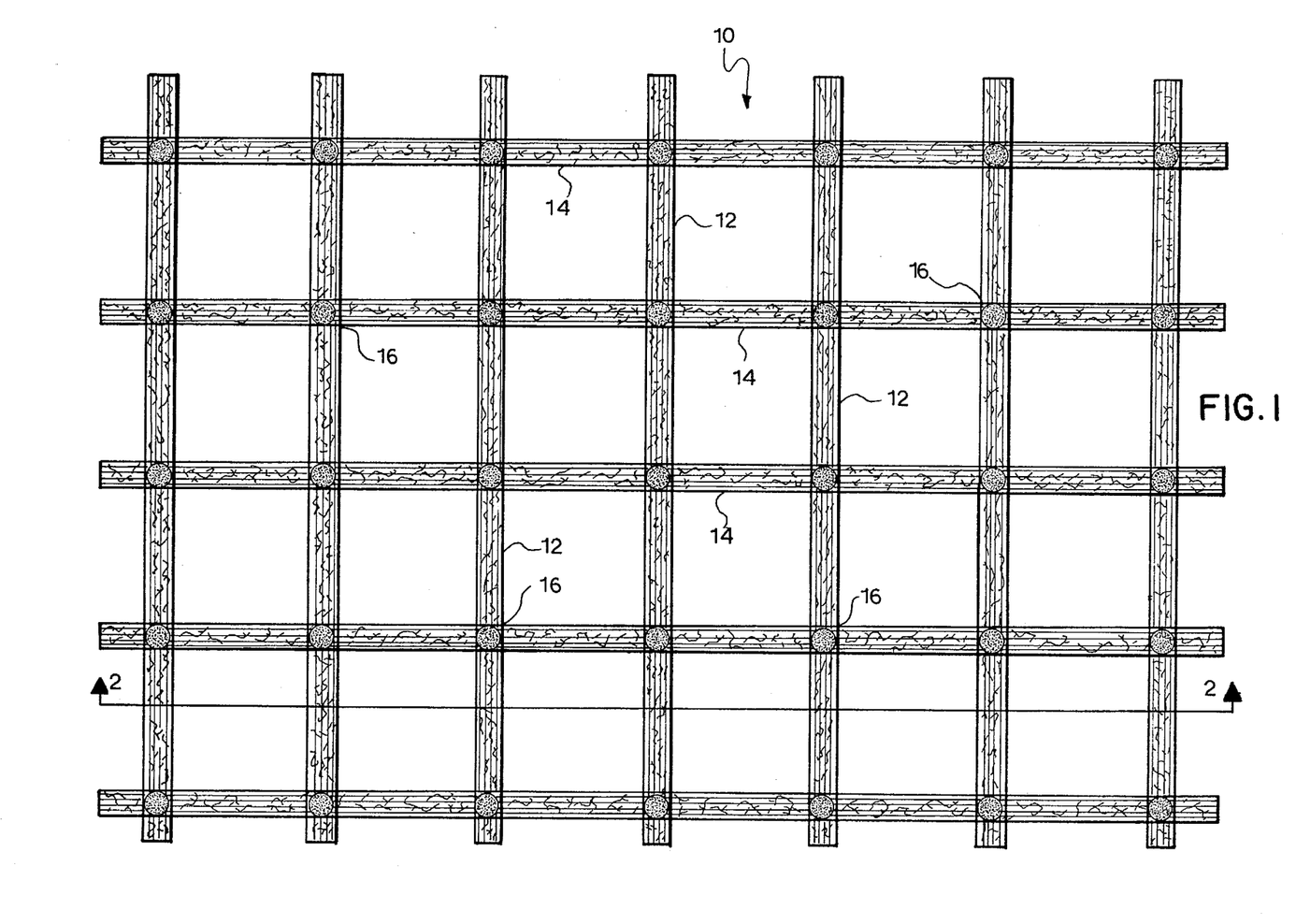
FIG. 1 is a top plan view of the preform of the invention.

As illustrated in FIG. 1, reinforcing preform 10 includes a transverse set of equally spaced and parallel strands or roving 12. These strands or roving 12 traverse a longitudinal set of equally spaced and parallel strands or roving 14 to create a plurality of junction points 16. The crossing strands or roving at each of these junction points 16 are held together by a thermoset bonding material, deposited onto the junction point and permitted to permeate therethrough. As a roving is an aggregate of strands, roving will be utilized hereafter to refer to either a strand or a roving.

Prior to application upon the junction points 16, the liquid thermoset binding material is stored within a vacuum sealed container. Included in this liquid thermoset binding material are appropriate chemical catalysts, inhibitors and accelerators for inducing the liquid material to gradually solidify upon exposure to air. When the liquid thermoset binding material is released onto a junction point 16, it permeates through the junction point 16, and solidifies therein. The solidified material rigidly connects each pair of crossing roving.

As illustrated in FIG. 1, preform 10 is fabricated to have a substantial distance between adjacent thermoset junction points 16. This substantial distance assures that preform 10 is extremely permeable to molten polymers. When a molten polymer layer is placed onto one side of preform 10, it flows through the permeable preform 10 and fuses with a polymer layer on the opposing side of preform 10. Upon returning the polymer to a solid state, the result is an exceptionally strong, reinforced composite.

Figure 3:
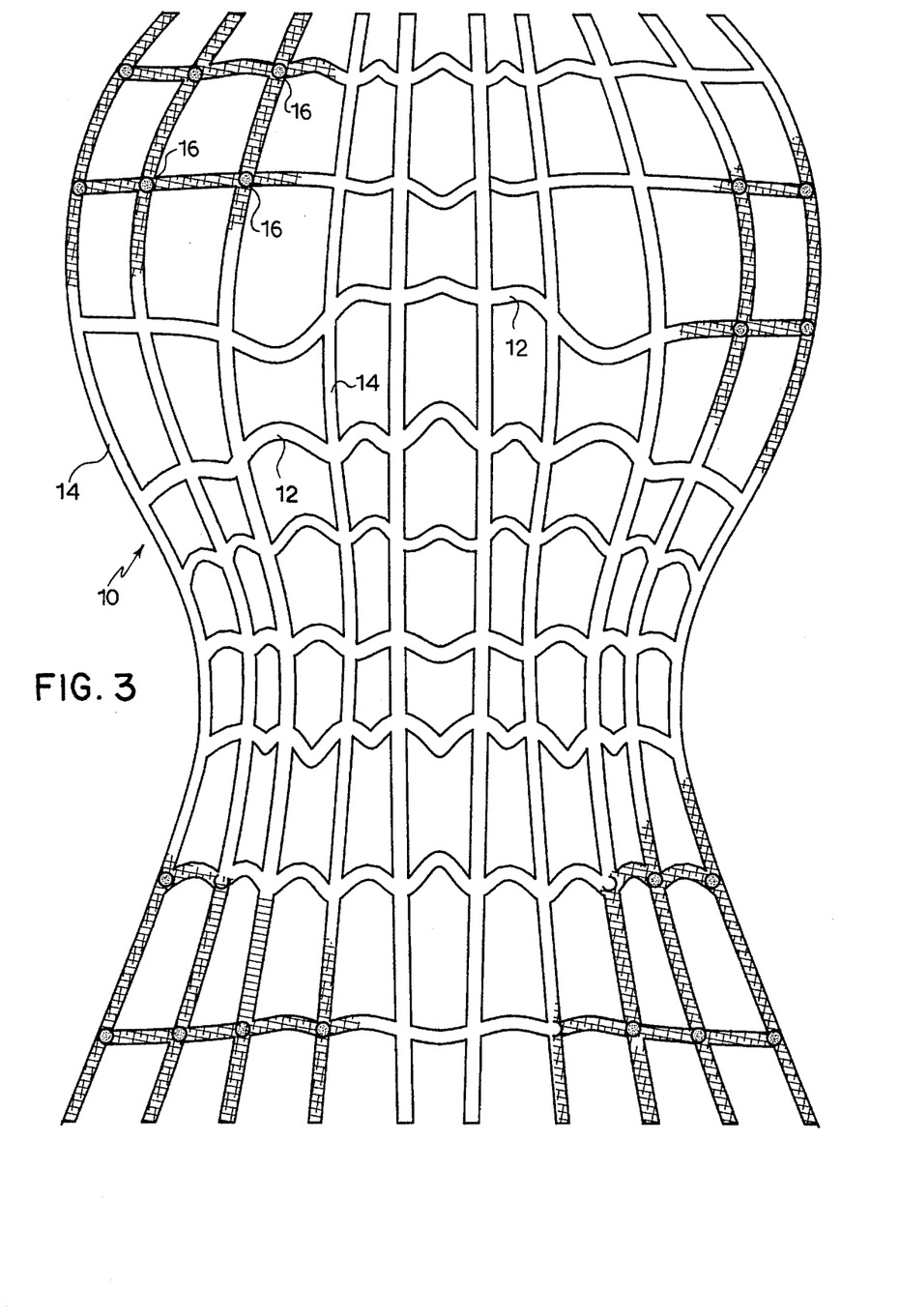
FIG. 3 is a top plan view of the preform of FIG. 1, showing the preform in a complex shape.

In addition to assuring permeability of preform 10, the substantial distance between adjacent junction points 16 promotes flexibility of preform 10. As depicted in FIG. 3, preform 10 is readily adjustable into complex shapes. This adjustability arises from the uninhibited movement of the portions of the roving 12,14 intermediate to junction points 16. These portions can bend or flex without engaging neighboring roving. For preforms fabricated with either closely or randomly spaced roving, there is a likelihood that movement of the roving will be inhibited by adjacent roving, thus hindering the ability of the preform to assume a complex shape.

Although a preform having a woven configuration is within the scope of this invention, the preferred embodiment is a layered arrangement, where transverse roving 12 form a first layer, and longitudinal roving 14 form a second layer. As with the spacial arrangement of roving 12,14, this linear arrangement aids in promoting flexibility of the preform. In such an arrangement, roving 12,14 are substantially stress free and therefore easily manipulated into complex shapes.

In contrast, the roving of a woven configuration are held under both tension and compression forces prior to attempted manipulation into a complex shape. These tension and compression forces restrict the roving flexibility by opposing its movement into a complex shape. The layered arrangement of roving 12,14 is also preferable because it is easily and accurately modelled for analysis. The linear arrangement of roving 12,14 is two dimensional, and therefore may be evaluated by two dimensional analysis. A woven configuration, on the other hand, must be modelled by an intricate three dimensional analysis, which is both time consuming and costly.

Although transverse roving 12 can be arranged to cross longitudinal roving 14 at any angle, it is preferable that such an angle is approximately 90 degrees. This arrangement creates a net-like structure having either rectangular or square openings within which molten polymer or polymer paste flows prior to solidifying by cooling or curing. Having the preform architecture forming rectangular or square openings creates a more predictable compound than that which results from a preform having arbitrary quadrilateral openings formed by strands crossing each other at angles other than 90 degrees.

Figure 2:
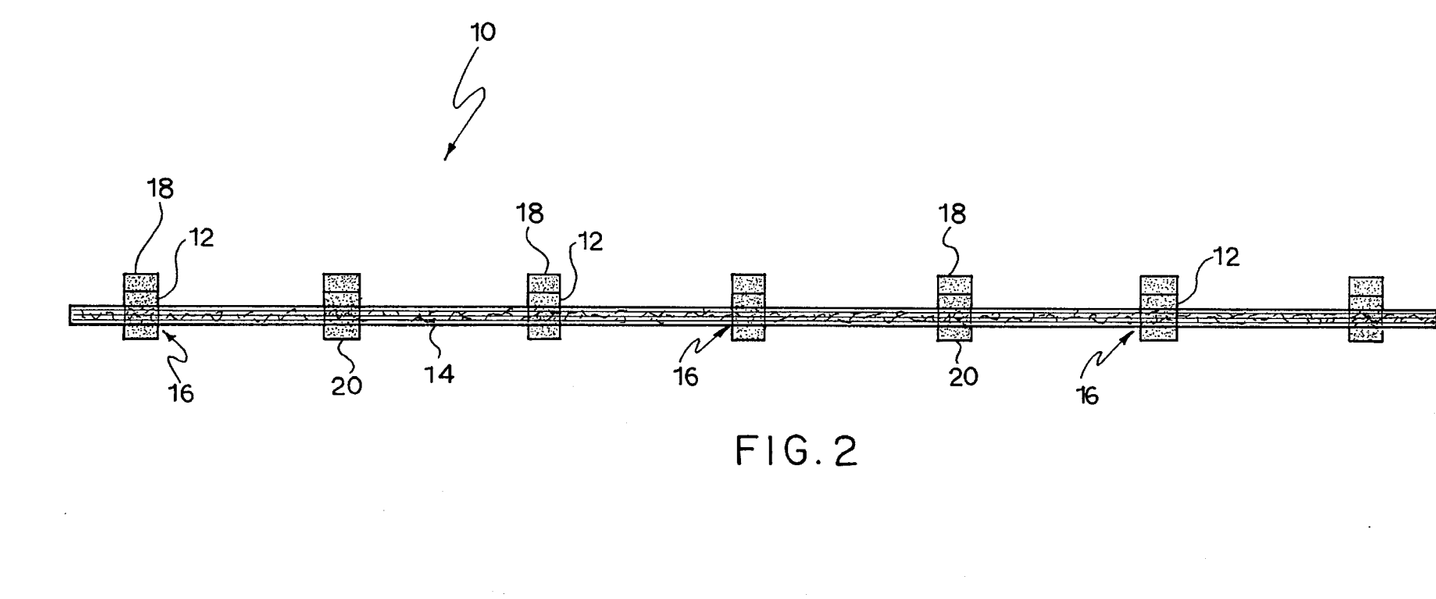
FIG. 2 is a front elevational view in cross section of the preform of FIG. 1.

As shown in FIG. 2, each thermoset junction point 16 includes an amount of thermoset binding material 18 that did not permeate into roving 12,14, but rather solidified upon the upper most portion of transverse roving 12. Additionally, each thermoset junction point 16 includes an amount of thermoset binding material 20 that permeated completely through roving 12,14 and solidified upon the lower most portion of longitudinal roving 14. Assuming the composition of roving 12,14 is known, it is possible to control the amount of thermoset bonding material that solidifies on both the upper most portion of transverse roving 12 and on the lower most portion of longitudinal roving 14. This is accomplished by adjusting the consistency of the thermoset binding material and also by adjusting the inhibitors and accelerators mixed therein.

Adjusting the amount of material on either the upper most portion of transverse roving 12 or on the lower most portion of longitudinal roving 14 enables the manufacturer of preform 10 to control the height of the material 18,20 in relation to roving 12,14 respectively. Hence, it is possible to control the minimum distance between preform 10 and a mold within which preform 10 may be placed. Additionally, if preform 10 is utilized in a composition containing a number of adjacently arranged preforms, the minimum distance between each preform can be controlled. As different intervals between adjacent preforms correspond to varying structural characteristics, the manufacturer can fabricate the preform to match his or her particular needs.

The material utilized for roving 12,14 can be any fiber capable of being formed into an elongated, continuous roving. Suitable materials are inorganic fibers, such as fiberglass, and organic fibers, such as aramid fibers. These fibers exhibit characteristics of both flexibility and durability. Any thermoset material that can be appropriately maintained in a liquid state can be utilized to bind the traversing roving at the junction points. One preferable material for this thermoset binder is unsaturated polyester resin mixed with standard catalysts, inhibitors and accelerators.

After the junction points 16 of preform 10 are bonded with the thermoset material, the composite is fabricated by placing preform 10 between two polymer paste layers and then compressing and heat treating the combination so that the polymer paste layers bond to each other at the open areas of the preform. If desired, composites could include any number of preforms 10, and any number of polymer paste layers.

One method for manufacturing a composite according to the invention is to place a first polymer paste layer into the female portion of a mold. The first polymer paste layer is then compressed so that it conforms to the shape of the mold. The preform 10 is then placed into the female portion of the mold, onto the polymer paste layer already positioned therein. The contents of the mold (preform and first polymer paste layer) are then compressed into the mold in a similar manner as the first polymer paste layer. A second polymer paste layer is then placed into the female portion of the mold, onto the preform. Again the contents of the mold are compressed. This process is repeated if it is desired to include additional layers of either preform or polymer paste, or both. A slight variation of this method is to heat the female portion of the mold prior to including each polymer layer therein. The temperature to which the mold should be heated is that temperature sufficient to permit the polymer to assume the shape of the mold, but that is not elevated to the point where the consistency of the polymer makes it difficult to place additional layers thereon.

If desired, inserts and sandwich holes can be incorporated into the composite. An insert is any device that is to be rigidly secured by the polymer layers. Sandwiched holes are gaps in the polymer layers that increase the flexural capabilities of the composite. These holes can be fabricated by placing such articles as a blow molded container into one or more of the polymer layers. Such a hole must be positioned between two layers of preform 10, which carry the load when the composite is deformed.

Subsequent to compressing the final layer into the mold, the male portion of the mold is tightly secured to the female portion. The closed mold is then suitably compressed within a molding press or similar device, and then the formed part is removed from the mold. This formed part is then heat and flame treated to complete the curing of the thermosetting material and to produce a desired surface finish.

The manufacture of the composite is not limited to the above described method. Rather, preform 10 can be placed within an injection mold, and then surrounded by a thermoplastic polymer melt. The contents of the mold are then cooled to enable the polymer melt to solidify, and the formed composite part is then removed from the mold.

Another method for manufacturing the composite includes placing preform 10 and at least two monomers into a reaction injection mold, where the monomers simultaneously polymerize and fill up the mold cavity. Still another method of manufacturing the composite is to place preform 10 within a molten metal injection mold, and then inject therein molten metal to surround preform 10. Further still, preform 10 can be placed within a thermoset resin transfer mold and then surrounded by thermoset polymer resin.

Figure 4:
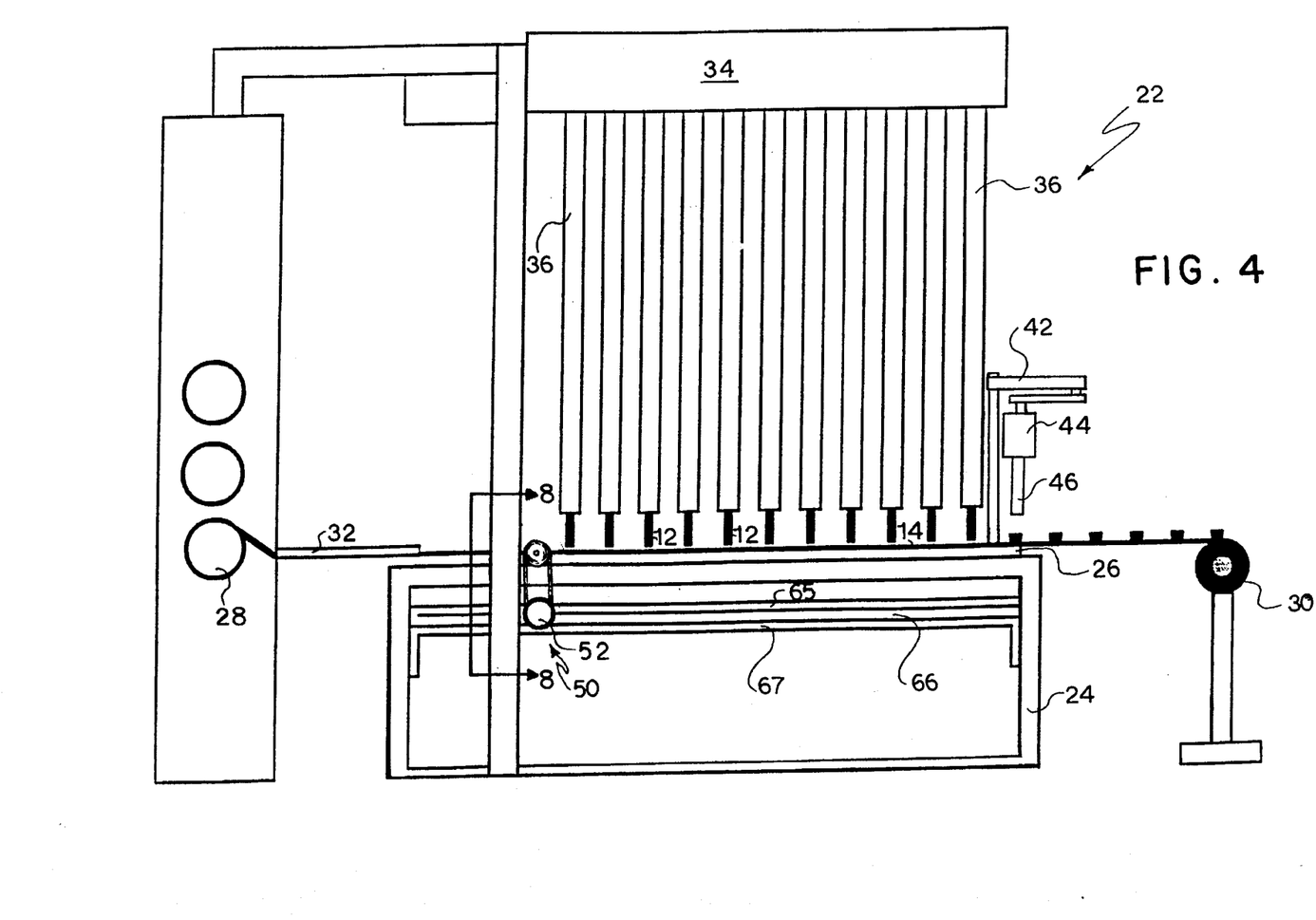
FIG. 4 is a side elevational view of an apparatus for manufacturing the preform of the invention.
Figure 5:
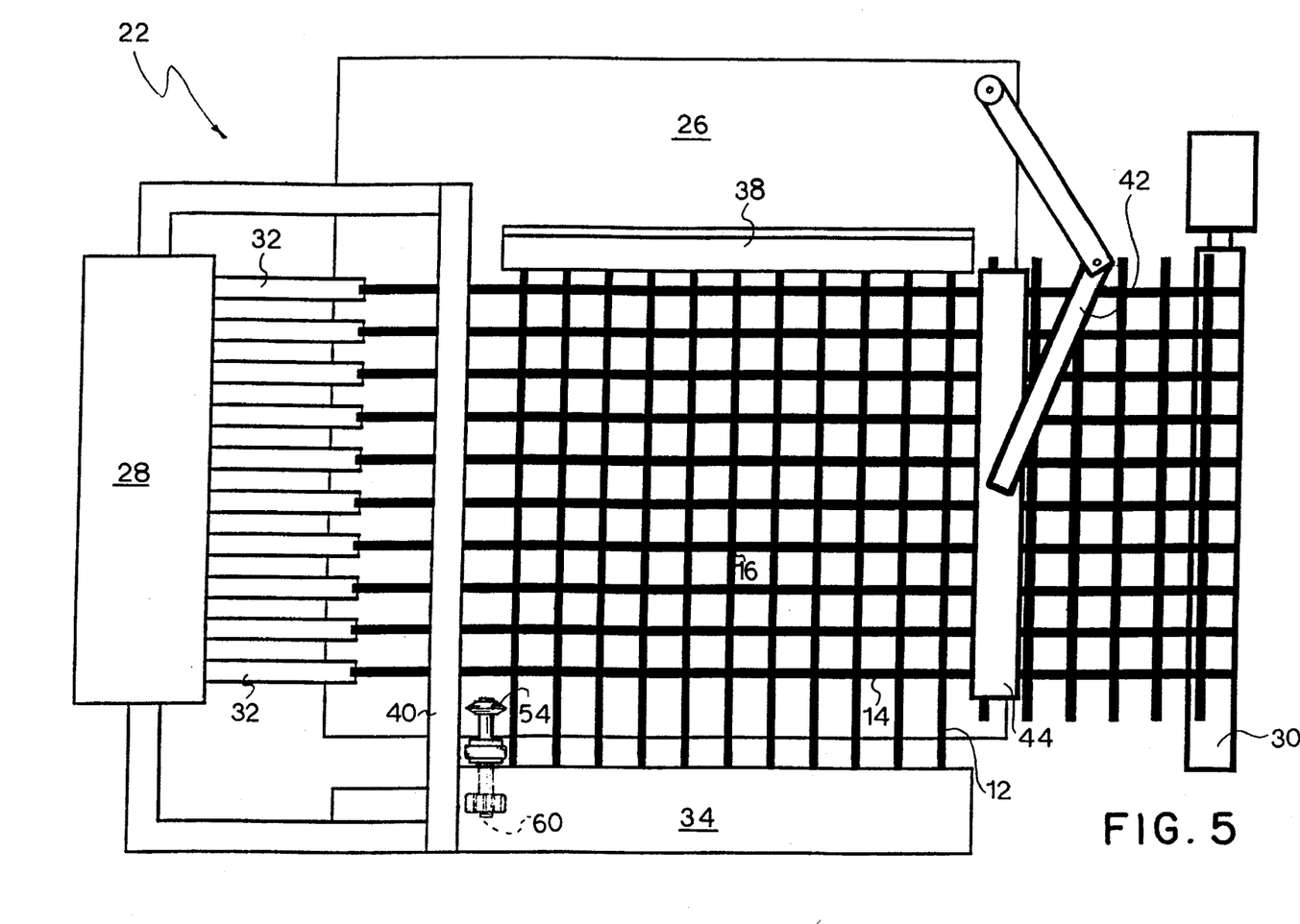
FIG. 5 is a top plan view of the apparatus of FIG. 4.

In FIGS. 4 and 5, there is illustrated an apparatus 22 for manufacturing preform 10. This apparatus 22 includes a support table 24 having a processing surface 26 upon which the longitudinal roving 14 and the transverse roving 12 are arranged prior to bonding the respective junction points 16. Longitudinal roving 14 are the first roving to be placed upon processing surface 26. These roving 14 are released from the longitudinal creel 28 and then pulled across processing surface 26 by the motorized spindle 30. Longitudinal creel 28 includes appropriate guides 32 for placing roving 14 upon processing surface 26.

After longitudinal roving 14 have been arranged upon processing surface 26, the transverse roving 12 are positioned so as to cross over longitudinal roving 14. These transverse roving 12 are released from the sliding creel 34, which includes a set of guides 36 for placing roving 12. The clamp 38 secures one end of transverse roving 12, while sliding creel 34 moves along member 40 and releases transverse roving 12 onto longitudinal roving 14. In FIG. 5, sliding creel 34 is illustrated in a position subsequent to releasing transverse roving 14.

Figure 6:
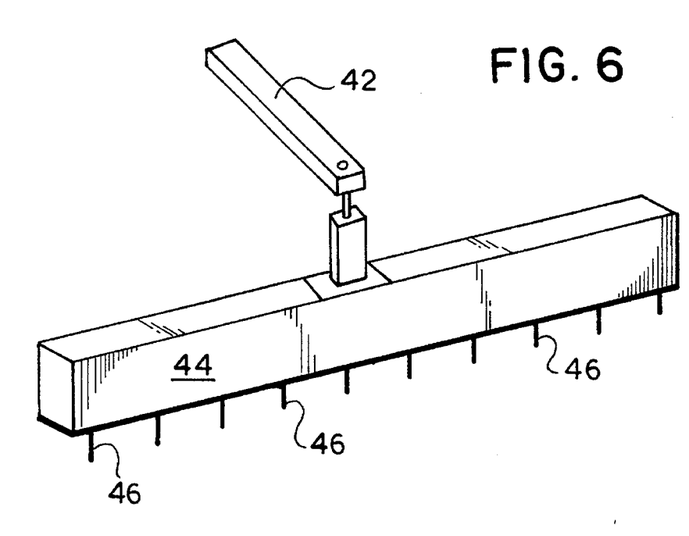
FIG. 6 is an enlarged, partial perspective view of the container of the apparatus of FIG. 4.
Figure 7:
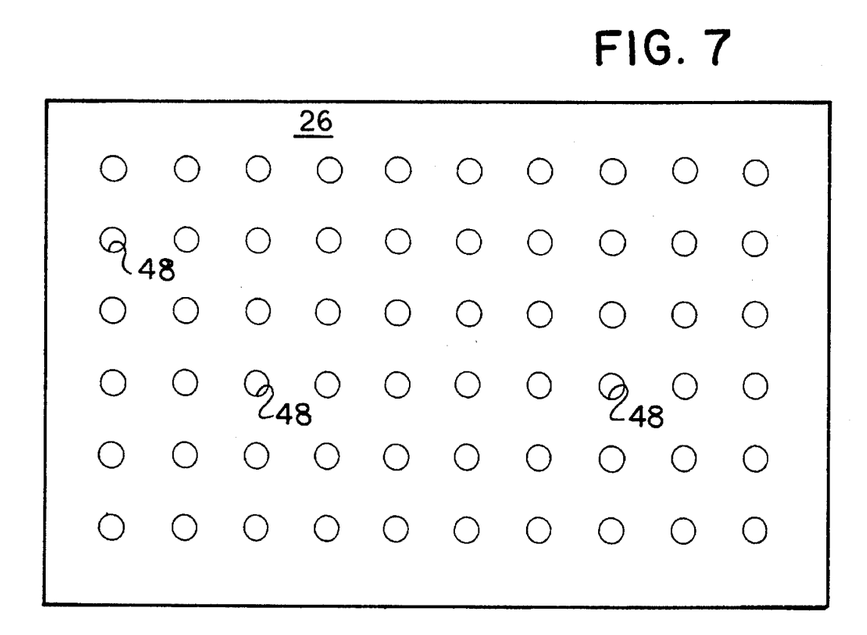
FIG. 7 is an enlarged, top plan view of the processing surface of the apparatus of FIG. 4.

The robot arm 42 supports the vacuum sealed container 44 which, as shown in FIG. 6, includes a plurality of syringes 46. The thermoset binding material is stored in container 44, and is released through syringes 46, onto the junction points 16. Included within processing surface 26 is a plurality of openings 48 upon which the junction points 16 are positioned prior to application of the binding material. These openings 48, which are illustrated in FIG. 7, prevent the thermoset binding material from adhering to processing surface 26 should this material completely permeate through the junction point 16 to which it was applied. This permits for easy advancement of preform 10 onto spindle 30, and also allows the thermoset binding material to appropriately solidify onto the lower most portions of longitudinal roving 14, as discussed above.

Figure 8:
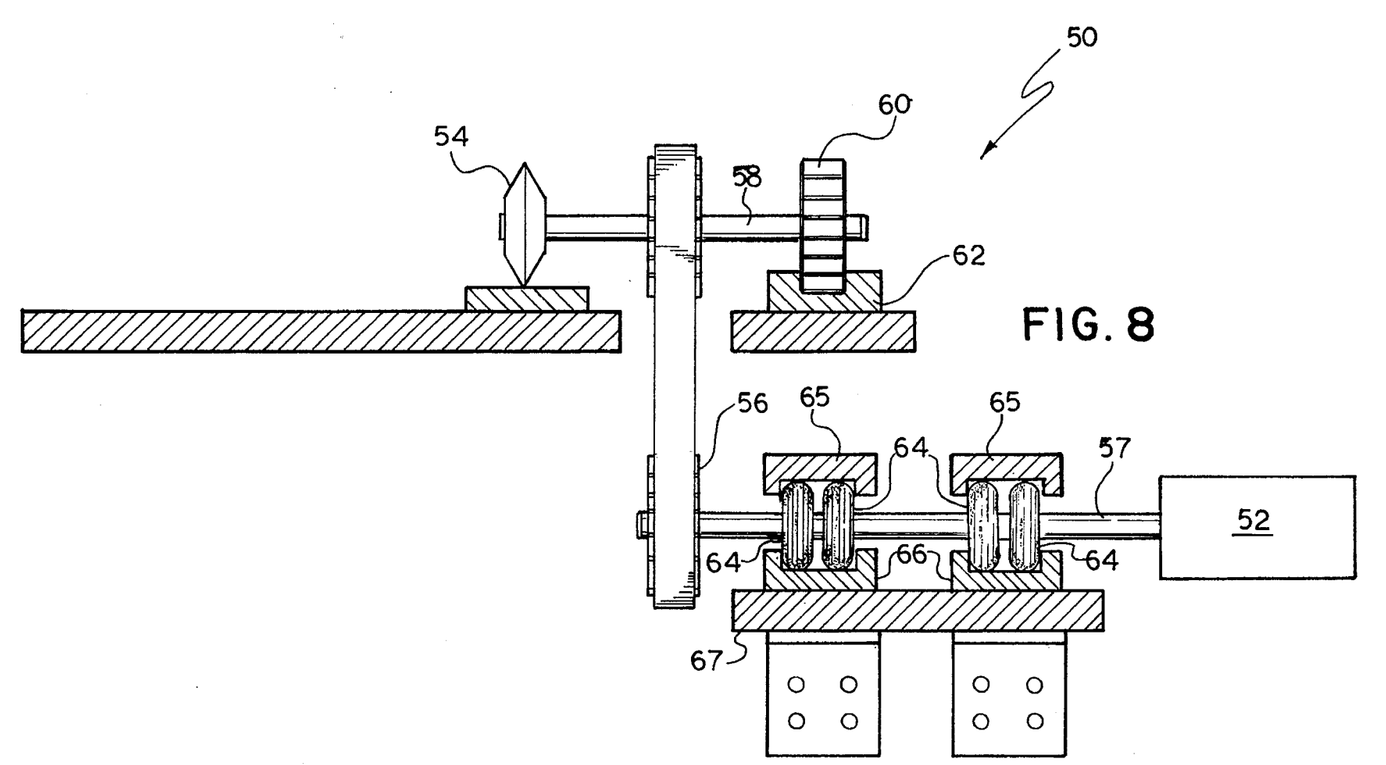
FIG. 8 is an enlarged, partial front elevational view of the cutting mechanism of the apparatus of FIG. 4.

After a portion of the preform has been formed, it is rolled upon spindle 30 for storage. Prior to this rolling, the cutting mechanism 50 severs transverse roving 14 from transverse creel 34. As depicted in FIG. 8, this cutting mechanism 50 includes a motor 52 for controlling both the rotational and longitudinal movement of the cutting wheel 54. This motor 52 causes gear 56 to rotate, which in turn causes shaft 58 to rotate. This rotation of shaft 58 also rotates both the cutting wheel 54 and the spur gear 60. As spur gear 60 rotates, it travels upon the rack gear 62 and carries the entire cutting mechanism 50 longitudinally along the length of processing surface 26. Annular bearings or rings 64 are positioned between the upper and lower surfaces 65,66, and facilitate movement of the shaft 57 therethrough. Both surfaces 65,66 act as a guide for the annular bearings 64, with the lower surface 66 being affixed to bearing plate 67, which is in turn affixed to the table 24.

Figure 9:
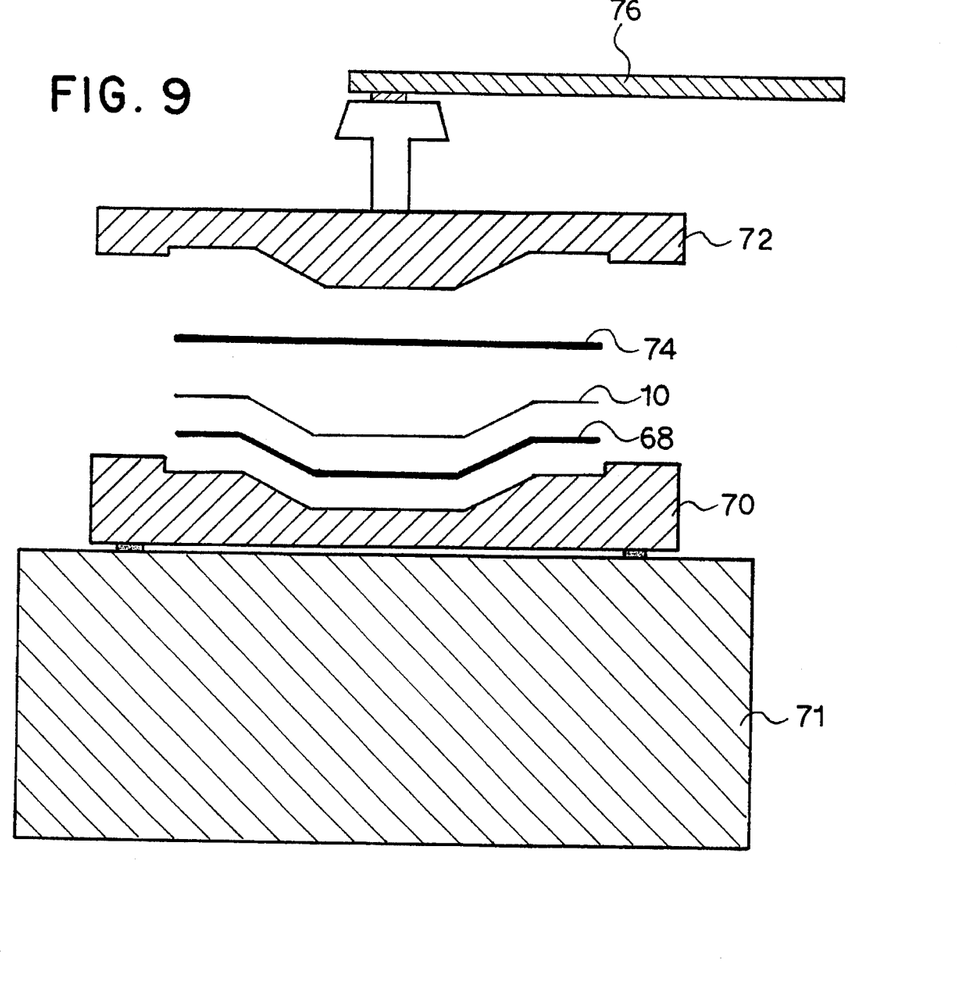
FIG. 9 is an enlarged, partially exploded, side elevational view of the mold of the present invention.

Once manufacture of preform 10 is complete, a desired amount of preform 10 can be cut from a manufactured roll of preform 10. The polymer layers can be added to the preform 10, and the entire structure can be molded as hereinabove described. A typical method of molding the structure is illustrated in FIG. 9. Here, the first polymer layer 68 and preform 10 are shown to be in the shape of the female mold 70, which is sitting upon table 71. These layers 68,10 have been compressed by the male portion 72 of the mold. That the layers 68,10 are spaced from the mold 70 is for illustrative purposes only, and obviously, during the addition of new layers 74, the already compressed layers 68,10 remain in the female portion 70 of the mold.

Figure 10:
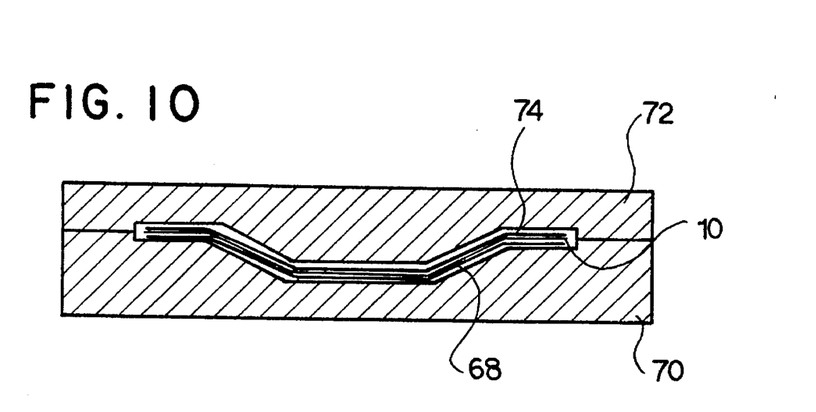
FIG. 10 is an enlarged, side elevational view of the mold of FIG. 9.

The second polymer layer 74 is illustrated to be substantially flat in nature. This layer 74 has not yet been compressed by male portion 72. When layer 74 is placed upon preform 10, the robot arm 76 moves the male portion 72 to compress the contents within female portion 70, and the structure of FIG. 10 is formed. This structure is then further compressed and heat treated, as necessary. In FIG. 10, the layers 68,10,74 are shown to be spaced from each other for illustrative purposes only.

Figure 11:
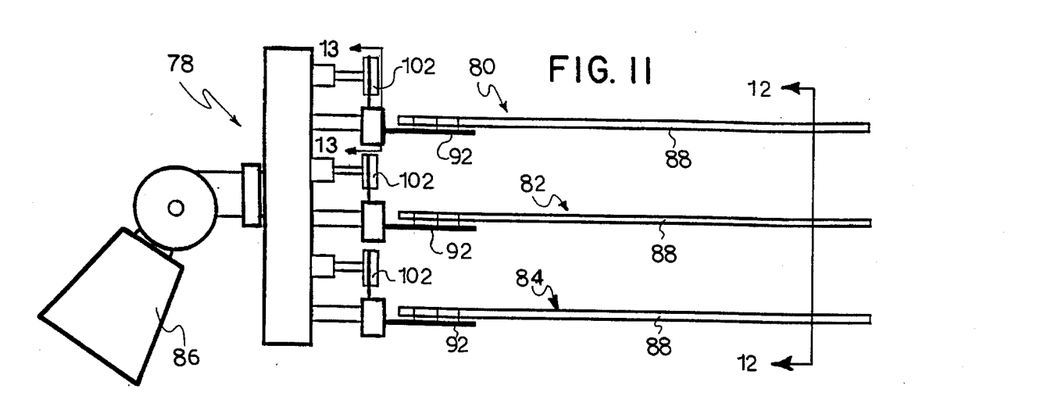
FIG. 11 is a side elevational view of an apparatus for delivering workpieces of the present invention to a mold.
Figure 12:
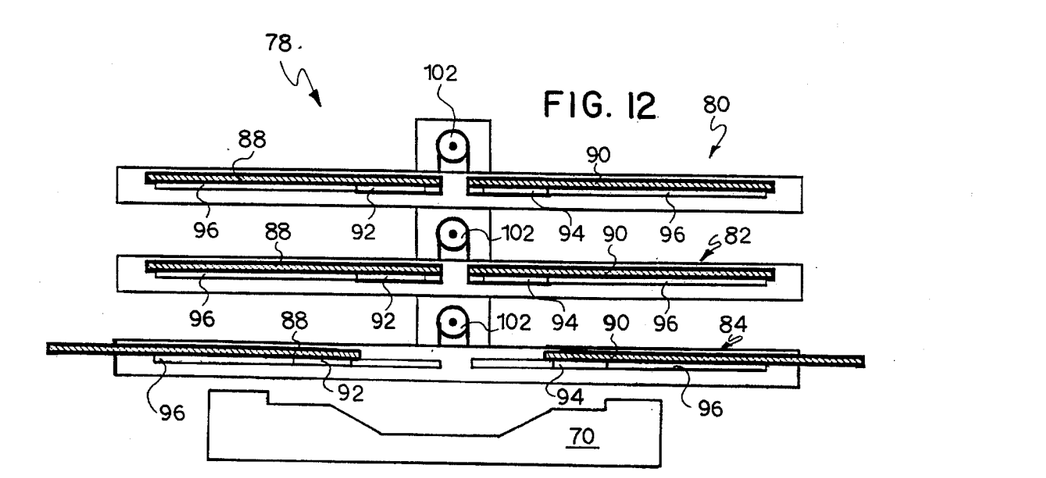
FIG. 12 is a front elevational view in cross section of the apparatus of FIG. 11.

The apparatus 78 depicted in FIGS. 11 and 12 is utilized to deliver layers 68,10,74 to female portion 70 of the mold. Although apparatus 78 is shown to include three workpiece releasing stations 80,82,84, the number of releasing stations could vary depending upon the number of layers to be added to female portion 70. As shown in FIG. 12, the robot arm 86 locates apparatus 78 above female portion 70, so one of the layers held at the stations 80,82,84 can be received therein. After one of these layers 68,10 or 74 has been released into the mold 70, robot arm 86 moves apparatus 78 away from mold 70, and male portion 72 compresses the contents of the mold.

Figure 13:
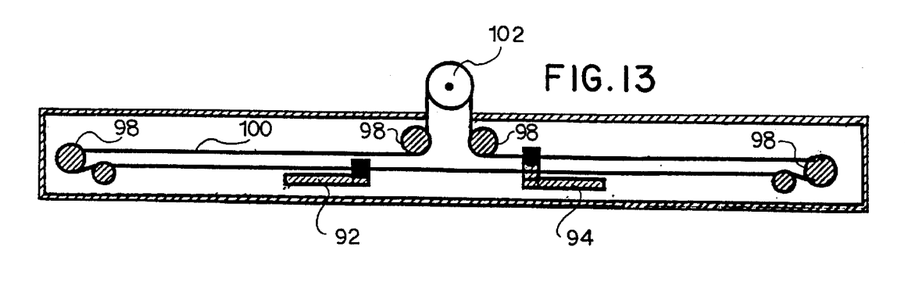
FIG. 13 is a front elevational view in cross section of one workpiece releasing station of the apparatus of FIG. 11.

Each of the workpiece releasing stations 80,82,84 are independently powered, and each includes a pair of plates 88,90, capable of separating from each other to release the workpiece stored thereon. Each of the separable plates 88,90 is attached to a support 92,94, and is movable inside a guide 96. As shown in FIG. 13, which is taken along line 13—13 of FIG. 11, a pulley mechanism controls movement of supports 92,94 within guides 96. This pulley mechanism includes an assortment of pulleys 98 having a cable 100 arranged thereon. Each of the supports 92,94 is connected to cable 100 such that clockwise rotation of the main pulley 102 separates plates 88,90 from each other, and counter clockwise rotation of main pulley 102 draws plates 88,90 closer to each other. In FIG. 12, plates 88,90 of the workpiece releasing station 84 are separated from each other, and the plates of workpiece releasing stations 80,82 are proximate to each other. After the workpiece has been released from station 84, arm 86 carries the apparatus away from mold 70, and permits compression arm 72 to engage the mold. Compression arm 72 travels away from mold 70, and arm 86 carries apparatus 78 back to mold 70, where the next workpiece can be released. This process continues until the plates of the upper most station have separated and released the workpiece initially held thereon.

It is to be understood that the present invention is not limited to the sole embodiment described above, but encompasses any and all embodiments within the scope of the following claims.

I claim:

1. A composite comprising at least one preform, said at least one preform comprising a plurality of inter-crossed roving arranged to form a plurality of junction points, at least one junction point of said plurality of junction points being configured to include a thermoset binding material for connecting the inter-crossed roving of said at least one junction point, said thermoset binding material essentially being confined to the area of said at least one junction point.

2. The composite according to claim 1, wherein said plurality of inter-crossed roving comprise:

a longitudinal set of roving, each of said longitudinal set of roving being essentially parallel to the others of said longitudinal set of roving; and a transverse set of roving, each of said transverse set of roving being essentially parallel to the others of said transverse set of roving.

3. The composite according to claim 2, wherein said plurality of inter-crossed roving is arranged in a layered configuration, said longitudinal set of roving forming a first layer, and said transverse set of roving forming a second layer.

4. The composite according to claim 3, wherein said longitudinal set of roving is substantially perpendicular to said transverse set of roving.

5. The composite according to claim 1, further including at least one hybrid polymer paste layer disposed upon said preform and molded thereto.

* * * * *